United States Patent
Tine

[15] 3,636,968
[45] Jan. 25, 1972

[54] CROSS-CONNECTION CONTROL VALVE

[72] Inventor: Sebastian David Tine, Lawrence, Mass.
[73] Assignee: Watts Regulator Company
[22] Filed: Oct. 5, 1970
[21] Appl. No.: 78,057

[52] U.S. Cl. ............................ 137/102, 137/218, 137/512.3
[51] Int. Cl. ...................................................... F16k 17/04
[58] Field of Search .......................... 137/102, 218, 512.3

[56] References Cited

UNITED STATES PATENTS

| | | |
|---|---|---|
| 2,472,933 | 6/1949 | Anderson ........................... 137/218 |
| 3,420,256 | 1/1969 | Kobnick ............................. 137/102 |
| 3,518,989 | 7/1970 | Seeler ............................... 137/102 X |

Primary Examiner—Robert G. Nilson
Attorney—Lettvin and Gerstman

[57] ABSTRACT

A cross-connection valve provides vertically spaced inlet and outlet valve seats with a balanced relief valve means interposed vertically between the inlet and outlet valve seats and a single abutment for bias means that effects closure of the outlet valve and biases the relief valve means toward a normally open condition. A special flexible construction and arrangement of valve parts and seats permits interconnection of the inlet valve and the relief valve means. The arrangement of parts provides for material reduction in size and cost of construction.

15 Claims, 5 Drawing Figures

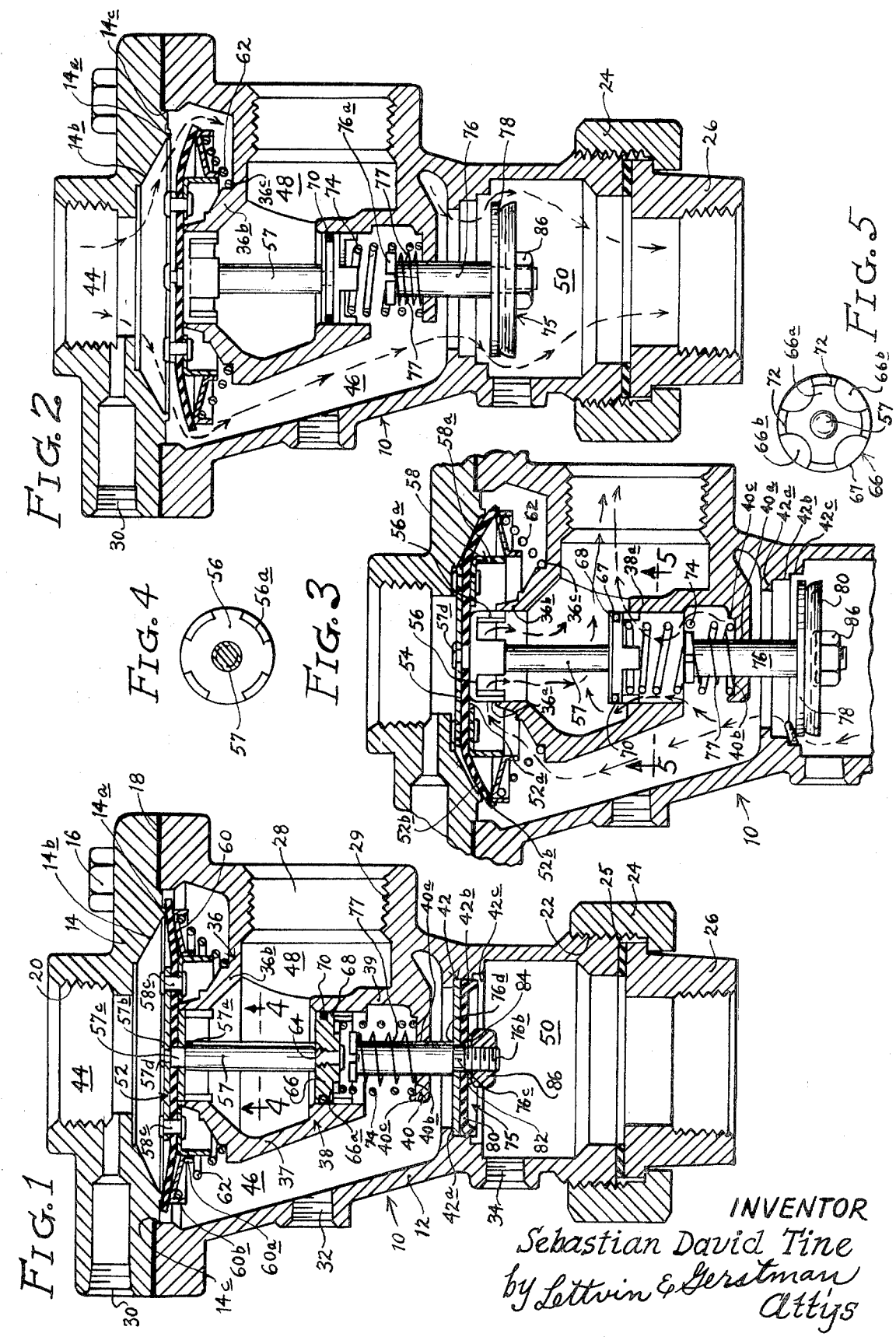

3,636,968

CROSS-CONNECTION CONTROL VALVE

BACKGROUND OF THE INVENTION

This invention relates to cross-connection valves, and more particularly relates to improvements in such valves wherein the various valve seats are vertically arranged, aligned and stacked relative to a common longitudinal axis which results in a compact and relatively inexpensive construction, and wherein the inlet flow control is interconnected with the relief valve means to provide a simplified and effective control that is particularly characterized by reduction in size and cost of construction.

The objectives of control of cross-connections in water supply systems, for protecting community health by preventing contamination of the water supply from backflows, have been widely disseminated by the Foundation for Cross-Connection Control Research of the University of Southern California in their publication "Manual of Cross-Connection Control Recommended Practice," first edition published in Aug. 1960.

A typical attempt to meet the requirements of cross-connection control is disclosed in U.S. Pat. No. 3,448,763.

Commercial devices made and sold by the establishment to whom said patent 3,448,763 is assigned are large, bulky and expensive by reason of the arrangement of valves therein and by reason of the sheer weight of material utilized in the structure.

SUMMARY OF THE INVENTION

The object of this invention is to provide an improved arrangement of valves in a cross-connection valve which will result in a construction that is simple and effective in operation and which results in a material reduction in size and cost of construction.

A further object of this invention is to provide in a cross-connection valve structure that performs multiple duty, such as inclusion of a common support for bias means for the outlet valve and the relief valve means, or inclusion of a flexible sheet that serves in part for relief valve purposes and in part for inlet valve control.

The economy achieved by the invention disclosed herein is demonstrated by the following comparison. Existing, commercially acceptable, cross-connection valves provide structure that weighs about 47 pounds for a valve in a 1-inch flow line, and weighs about 105 pounds for a 2-inch valve. With the construction herein disclosed, a valve for a 1-inch line will weigh about 7 pounds, and a valve for a 2-inch line will weigh about 35 pounds.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawing.

BRIEF DESCRIPTION OF THE DRAWING

FIGS. 1-3 are longitudinal, vertical, cross-sectional views of a cross-connection valve embodying the features of this invention, and showing in FIG. 1 the attitude and position of parts thereof when the upstream pressure is sufficient to close the relief valve means and there is no flow through the valve, with FIG. 2 showing the attitude and positions of parts thereof when there is flow through the valve, and with FIG. 3 showing the attitude and position of parts thereof when the pressure differential across the inlet valve has fallen below a first predetermined level, or when the downstream pressure is high enough relative to the upstream pressure, or when a piece of dirt prevents the outlet valve from seating as shown, to tend to cause a backflow condition in the valve;

FIGS. 4 and 5 are views respectively of the underside of the upper and lower guides of the balanced relief valve and are taken respectively substantially on line 4—4 of FIG. 1 and substantially on line 5—5 of FIG. 3.

DESCRIPTION OF THE PREFERRED EMBODIMENTS

Referring now to the drawings, a cross-connection valve, generally indicated at 10, is shown to include an upright, elongated, hollow valve body 12 with an annular inlet cap 14 formed separately from body 12 but secured thereto by a plurality of spaced, annularly arranged, headed securement bolts 16. An annular gasket 18, located between the upstream end of body 12 and cap 14, provides a leakproof joint.

The upper end of inlet cap 14 may be female threaded at 20 to provide a means for connection to a liquid delivery pipe not shown. The lower end of body 12 may be male threaded at 22 to provide means for connection to an outlet such as through a coupling connection with a union nut 24 having an inturned annular flange that clampingly engages a union tailpiece 26 against a washerlike seal gasket 25. The union tailpiece 26 is shown appropriately threaded to adapt it for connection to an outlet pipe. Between the upper and lower ends of body 12 there is provided a laterally opening vent-and-relief output 28 that may be female threaded, such as at 29, to provide means for connection to a vent, or relief, pipe as is well known in the art.

In the assembly shown in FIG. 1, three pressure takeoff taps are shown provided at vertically spaced points along the valve 10. Thus, cap 14 has been provided with a tap 30 through which static intake pressure may be sensed, the body 12 has an intermediate tap 32 through which pressure in body 12 between the intake and outlet may be sensed, and body 12 has a lower tap 34 through which pressure at the outlet end of the valve may be sensed.

Within the hollow body 12 there are provided four vertically spaced, longitudinally stacked, transverse walls, the uppermost being indicated at 36, the second highest at 38, the next highest at 40, and the lowest at 42. Within the hollow body 12 there are generally upright, internal interconnecting walls which aid in separating the interior of body 12 into two regions. A first interconnecting wall 37 extends between the upper and second transverse walls 36 and 38. A second upright interconnecting wall 39 extends between transverse walls 38 and 40. The said arrangement of transverse walls and interconnecting walls operates to substantially separate an intermediate flow portion of the valve from a normally vented portion of the valve as hereinafter described.

Considering the valve thus far described there are four principal regions within the valve 10, the uppermost inlet 44, an intermediate upright flow region 46, a lower outlet 50, and a generally laterally offset relief discharge region 48. In normal flow through the valve, liquid passes from inlet 44 through intermediate region 46 to outlet 50 since intermediate region 46 is normally shut off and separated from relief discharge region 48. However, under certain conditions hereinafter described, communication with be established between intermediate region 46 and relief discharge region 48 and inlet 44 will be shut off and separated from both regions 46 and 48.

Considering now the transverse walls within the valve housing, there is provided on the upper transverse wall 36 an annular valve seat 36a that is provided by an edgelike structure. Spaced below, or downstream of seat 36a, is a spring-centering boss or sleeve 36b which merges therebelow with an annular spring seat 36c. In the second wall 38 there is defined a cylindrical valve seat 38a that provides a sleeve-type sealing surface. On the third transverse wall 40 there is provided a central, cylindrical through bore 40a that serves a guiding function. The bore 40a is surrounded by a flat, annular, depressed recess 40b that is bounded at its outermost edge by an upstanding cylindrical retainer shoulder 40c. In the lowestmost wall 42 there is defined an upper abutment 42a that faces downstream and which is spaced upstream of an annular edge 42b that serves as a valve seat concentrically within and upstream of an adjacent, enlarged, downstream recess 42c into which an edge of a disclike valve member may enter.

On cap member 14 there is provided a downstream-facing, annular, edge-type valve seat 14a arranged concentrically surrounding, and spaced upstream of, the edge-type valve seat 36a on the upper transverse wall. Upstream of valve seat 14a, cap 14 is shaped to provide a frustoconical relief, or bevel, 14b for accommodating movement thereinto of a portion of a disclike valve member hereinafter described. The cap 14 is provided with an annular centering shoulder 14c for centering cooperation with an upper portion of valve body 12.

A large flexible sheet 52 of a resilient material, such as rubber or the equivalent, and of a dimension greater than the diameter of valve seat 14a, is provided located between valve seat 14a and valve seat 36a. The flexible sheet 52 provides an inner, or central, valve seat portion 52a that is adapted to sealingly engage the valve seat 36a. The sheet 52 also provides an annular outer valve seat portion 52b that is adapted to sealingly engage the intake valve seat 14a. A rigidifying backup disc 54, of greater dimension than valve seat 36a is secured to the upstream, or back, side of the central portion of sheet 52. A guide 56 of smaller dimension than valve seat 36a is secured to the downstream side of sheet 152 centrally of valve seat portion 52a. The guide 56 has downturned, axially extending, spaced, finger portions 56a, as best seen in FIG. 4, which provide the guiding function while permitting flow past valve seat 36a when in the position of FIG. 3. A cup-shaped guide sleeve 58 of greater dimension than valve seat 36a, but of lesser dimension than valve seat 14a is also secured to the downstream side of flexible sheet 52, and such guide sleeve 58 provides a downwardly extending annular flange 58a.

An elongated stem 57 is provided which secures together the backup disc 54, the central portion of flexible sheet 52, and the guide 56. Stem 57 provides a lower shoulder 57a for engagement with the disc portion of guide 56, a second shoulder 57b spaced above shoulder 57a so as to provide a shank 57c of lesser axial dimension than the combined thickness of the bottom of guide 56 and sheet 52, and a head 57d which clamps backup disc 54 against second shoulder 57b so as to compress sheet 52 between disc 54 and the bottom of guide 56. A plurality of securement rivets 58c secure the annular flange 58b of guide sleeve 58 to the backup disc 54. The assembly thus defined provides a rather rigid central portion on sheet 52 which exposes valve seat portion 52a of sheet 52 for sealing engagement against edge-type valve seat 36a.

The outer annular portion of flexible sheet 52 is designed to serve as a valving member for cooperation with intake valve seat 14a on cap 14. Toward this end there is provided an annular, rigid backup member 60 of sheet metal which is flanged at its edges for rigidity and with the inner flange 60a thereof arranged for sliding cooperation with downturned flange 58c of the guide sleeve 58. The flanged backup member 60 serves both to rigidify the outer annular portion of flexible sheet 52 and, being provided with a downwardly turned, outer annular flange 60b, serves as a retainer and seat for the upper, outer end of a frustoconical compression spring 62 whose lower inner end is centered, by the spring-centering boss 36b, and seated upon spring seat 36c.

The lower end of stem 57 is threaded at 64 to cooperate with a disclike member 66 which has a cylindrical outer periphery 67 in which is defined a recess 68 for receiving and retaining an O-ring 70. The cylindrical outer periphery 67 is selected to lie closely adjacent the sleevelike valve seat 38a. The disc 66 is provided with a spring-centering shoulder means 66a located inwardly of depending, spaced, guide fingers 72 which operate to prevent disc 66 from being misaligned with sleeve seat 38a when the valve 66 moves to an upper position, as illustrated in FIG. 3. The guide fingers 72 are also seen in FIG. 5 which also illustrates relief flow sections 66b defined on the underside of the disc 66, past which liquid flows when O-ring 70 clears valve seat 38a, as illustrated in FIG. 3.

A relief valve bias means in the form of a spring 74 is provided with the upper end thereof engaging the underside of disc 66 and the lower end of said spring engaging the third wall 40. The upper end of spring 74 is centered by shoulder 66a while the lower end of spring 74 is centered by shoulder 40c.

An outlet valve, generally indicated at 75, is provided in the valve body 12. The valve 75 includes an elongated stem 76 whose shank is slidingly received in central through bore 40a. The upper end of stem 76 has a head 76a for seating the upper end of a compression coil spring 77 that serves to normally bias the valve 75 toward a closed position. The lower end of spring 77 is seated against recess 40b concentrically within spring 74. The lower end of stem 76 is threaded at 76b. A reduced shank 76c is provided for defining a shoulder 76d against which is positioned a backup disc retainer 78 whose outer dimension is so selected as to permit retainer 78 to slide past valve seat 42b but to engage and abut shoulder 42a. A disc of flexible and resilient material 80 is provided in engagement with the downstream side of disc 78 and is of a selected dimension large enough to sealingly seat against valve seat 42b. The enlarged recess 42c that surrounds seat 42b accommodates entry thereinto of the portion of disc 80 that extends outwardly of valve seat 42b. The retainer 78 and flexible disc 80 are retained on shank 76c by means of a retainer washer 82, a lock washer 84, and a hex nut 86 screwed onto threaded stem portion 76b.

From the foregoing, the operation of the device will be readily understood by comparing the different positions of portions of the valve as illustrated in FIGS. 1–3. The bias of spring 62 is such as to normally force the outer annular valve portion 52b against valve seat 14a and to maintain the entry to valve body 12 closed at pressures at the inlet 44 that are below a first preselected level. When there is a demand for water, and the pressure differential across valve portion 52b increases above a preselected value of, just slightly above 2 p.s.i.g., then the valve 52b–14a opens as shown in FIG. 2 and liquid flows from inlet 44 through intermediate region 46 to outlet 50. Although spring 74 normally biases the balanced relief and vent valve, consisting of inner valve portion 52a and O-ring valve 70 toward an uppermost position, as seen in FIG. 3, the spring force of bias means 74 is selected so that the balanced valve will be seated, as shown in FIG. 1, at a pressure of about 2 p.s.i.g. which is below the preselected pressure level at which the valve 52b opens to permit flow past valve seat 14a.

In the event of a back pressure condition existing in the valve, which is shown in FIG. 3 with the balanced relief valve 52a–70 in the raised position, the upward movement of the balanced relief valve serves to open passageways that permit of liquid flow past both upper valve seat 36a and through sleeve valve 38a. If the downstream, or outlet, valve 75 has failed to fully close for any reason, such as due to lodgment of dirt at the valve seat 42b, then any backflow through the downstream valve 75 will pass outwardly of valve body 12 through vent-and-relief outlet 28 as in the condition illustrated in FIG. 3. Any increasing back pressure only serves to effect a more positive seal of valve portion 52b against valve seat 14a. If there should be a back siphonage condition, the upward movement of the balanced vent-and-relief valve 52a–70 operates to prevent contamination to the intake or supply of liquid.

The structure in valve 10 of the vertically stacked arrangement of transverse walls 36, 38, 40 and 42, and the use of a single flexible and resilient sheet 52 to provide two valves that are required to move in opposite directions in order to seat on their respective valve seats, operate to provide an improved and less expensive cross-connection valve. The arrangement readily lends itself to a simple casting and machining operation. By having valve seats 36a and 40a coaxial and both of larger diameter than elements 40a–40c permits of machining operations to form such elements through the upper open end of valve body 12. The elements defined in wall 42 are easily machined through the lower open end of valve body 12. Similarly, assembly of the valves within body 12 is easily accomplished with the structure disclosed.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new and desire to secure by Letters Patent of the United States is:

1. In a cross-connection valve for preventing contamination of a liquid source by utilization of spaced inlet and outlet valves intended to control liquid entry to an intermediate region that is adapted to communicate at preselected pressure conditions to atmosphere through relief valve means, the improvement of a compact and economically advantageous arrangement of valves and housing therefor comprising, in combination: a unitary elongated substantially hollow valve body defining outer casing means with open upper inlet and lower outlet ends and having an upright longitudinal axis, means within the valve body defining four vertically spaced wall portions lying in parallel planes transverse to the longitudinal axis of the valve body, the two uppermost transverse wall portions bounding in part a relief discharge region that is open to atmosphere, said two uppermost transverse wall portions providing thereon surfaces to be simultaneously engaged by valve means for isolating the intermediate region from the relief discharge region, and the two lowermost transverse wall portions providing a mounting and valve seat for the outlet valve.

2. A construction as in claim 1 in combination with an annular cap for securement to the upper open inlet end of the casing, an annular valve seat defined on said annular cap for location in a plane parallel to the said uppermost transverse wall portion within the valve body.

3. A construction as in claim 2 including an annular portion of the uppermost transverse wall portion being shaped and arranged to provide a spring seat spaced axially below the annular valve seat on said annular cap.

4. A construction as in claim 1 wherein the next to lowest one of the transverse wall portions is shaped and arranged to provide means for guiding reciprocation of the outlet valve in axial directions, said transverse wall portion also serving as the seat for spring means for biasing the outlet valve toward a closed position and for biasing the relief valve means toward an open position.

5. A construction as in claim 1 wherein one of the two uppermost transverse wall portions provides an annular edge surface as a valve seat and the other of the two transverse wall portions provides an annular sleeve surface as a valve seat, and the relief valve means includes a pair of spaced valves joined together by a reduced stem, one of the valves including a planar type valving member for engagement with the edge surface type valve seat and the other valve including an O-ring type valving member for sliding valving movement in said sleeve surface type valve seat.

6. In a cross-connection valve for preventing contamination of a liquid source by utilization of spaced inlet and outlet valves intended to control liquid entry to an intermediate region that is adapted to communicate at preselected pressure conditions to atmosphere through relief valve means, the improvement of an interconnected inlet valve and relief valve means comprising, in combination: valve body means; an inlet valve seat on said valve body means past which incoming liquid, at a preselected pressure differential in excess of outlet pressure, passes to the intermediate region; spaced relief valve seats on said valve body means past which the intermediate region may be caused to communicate with atmosphere; the inlet valve seat and two relief valve seats being arranged substantially coaxially in parallel planes with a first of the two relief valve seats closer to the inlet valve seat; a sheet of resilient material positioned and arranged to provide a central section, that is adapted to sealingly engage the said first of the two relief valve seats, and an annular section, positioned outwardly of said central section and adapted to sealingly engage the inlet valve seat; a pair of balanced relief valves, including said central section of the sheet of resilient material, coupled to move simultaneously between seated and unseated positions on said spaced valve seats; first bias means biasing the pair of balanced relief valves with a first force toward an unseated position; second bias means biasing the annular section of the sheet of resilient material, with a second force greater than said first force, to a seated position against said inlet valve seat, so that when upstream pressure of fluid at the inlet of the valve body, or the differential pressure between said inlet and intermediate region, is below a first preselected level, then the inlet valve remains closed and the relief valve means is open to atmosphere, and when the upstream pressure is above a second higher preselected level, then the relief valve means is closed and the inlet is open, and when the upstream pressure is in an amount between said two preselected pressure levels, then the relief valve means is closed.

7. A device as in claim 6 wherein the first of the two relief valve seats is in the form of an annular edge surface and the second of the relief valve seats is in the form of an annular sleeve surface 8. A device as in claim 7 wherein the second of the pair of relief valves includes an O-ring type seal for sliding sealing engagement with the sleeve surface seat.

9. A device as in claim 6 including rigidifying means engaging the central section of the sheet of resilient material opposite to the side of the sheet that is adapted to engage the said first relief valve seat.

10. A device as in claim 6 including a rigidifying annulus engaging the annular section of the sheet of resilient material opposite to the side of the sheet that is adapted to engage the said inlet valve seat.

11. A device as in claim 6 wherein the sheet of resilient material is located between the first relief valve seat and the inlet valve seat, first rigidifying means engaging the side of the central section of the sheet opposite the first relief valve seat, second rigidifying means engaging the side of the annular section of the sheet opposite the inlet valve seat, the resilient sheet affording flexing movement to permit the central portion and annular portion thereof to move in opposite directions.

12. A device as in claim 11 wherein the second rigidifying means is shaped to provide a seat for the second bias means.

13. A device as in claim 11 including guide means secured to the first rigidifying means and positioned to guidingly cooperate with the second rigidifying means.

14. A device as in claim 9 including a centering guide secured to the rigidifying means and positioned to guidingly cooperate with a portion of the valve body means adjacent the first relief valve seat during the entire range of movement of the relief valve means.

15. A device as in claim 13 including a centering guide secured to the first rigidifying means inwardly of the portion of the resilient sheet that is adapted to seat on the first relief valve seat for aiding in maintaining alignment of the relief valves for all positions of said relief valves.

* * * * *